(12) United States Patent
Junior et al.

(10) Patent No.: US 11,299,251 B2
(45) Date of Patent: Apr. 12, 2022

(54) RETRACTABLE CARGO DECK ENTRANCE GUIDE ASSEMBLIES FOR PALLETIZED LOADS IN CARGO AIRCRAFT

(71) Applicant: EMBRAER S.A., São José dos Campos-SP (BR)

(72) Inventors: Mario Tadeu Crema Junior, São José dos Campos-SP (BR); Saint Clair Trisotto, São José dos Campos-SP (BR); Guilherme Peneluppi Corrêa, São José dos Campos-SP (BR); Guilherme Barbosa de Sousa, São José dos Campos-SP (BR)

(73) Assignee: EMBRAER S.A., São José dos Campos-SP (BR)

( * ) Notice: Subject to any disclaimer, the term of this patent is extended or adjusted under 35 U.S.C. 154(b) by 427 days.

(21) Appl. No.: 16/442,794

(22) Filed: Jun. 17, 2019

(65) Prior Publication Data
US 2019/0382095 A1    Dec. 19, 2019

Related U.S. Application Data

(63) Continuation of application No. 62/686,785, filed on Jun. 19, 2018.

(51) Int. Cl.
*B64C 1/20* (2006.01)
*B64D 9/00* (2006.01)
*F16B 5/06* (2006.01)

(52) U.S. Cl.
CPC .......... *B64C 1/20* (2013.01); *B64D 9/00* (2013.01); *F16B 5/0621* (2013.01)

(58) Field of Classification Search
CPC .. B64C 1/20; B64D 9/00; B64D 9/003; F16B 5/0621

See application file for complete search history.

(56) References Cited

U.S. PATENT DOCUMENTS

| | | | | |
|---|---|---|---|---|
| 5,098,038 A | * | 3/1992 | Hruska | B64D 9/003 193/35 SS |
| 7,530,774 B2 | * | 5/2009 | Roberts | B60P 7/0892 410/69 |
| 8,066,458 B2 | * | 11/2011 | Schulze | B64C 1/20 410/80 |
| 2005/0008443 A1 | * | 1/2005 | Eitzenberger | B60P 7/13 410/94 |

* cited by examiner

*Primary Examiner* — Richard R. Green
*Assistant Examiner* — Steven J Shur
(74) *Attorney, Agent, or Firm* — Nixon & Vanderhye P.C.

(57) ABSTRACT

Retractable guide assemblies are provided to guide cargo load pallets onto a cargo deck of a cargo aircraft, the guide assembly having a support subassembly comprising a recessed housing box, a moveable guide subassembly pivotally connected to the support subassembly so as to be pivotally moveable relative thereto, and an actuator subassembly operatively interconnecting the moveable guide subassembly and the support subassembly. The actuator subassembly may thereby allow the moveable guide subassembly to be pivotally moveable between (i) a releasably locked stowed condition, (ii) a releasably locked deployed condition and (iii) a freely moveable unlocked maintenance condition.

19 Claims, 15 Drawing Sheets

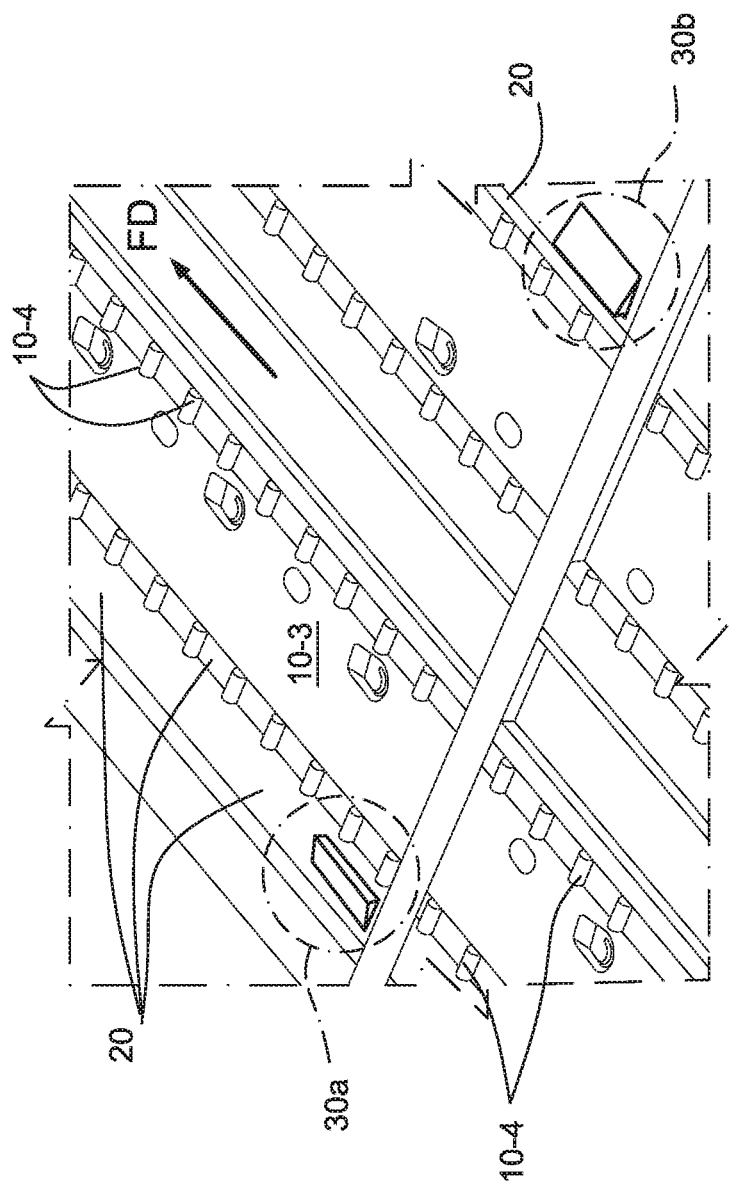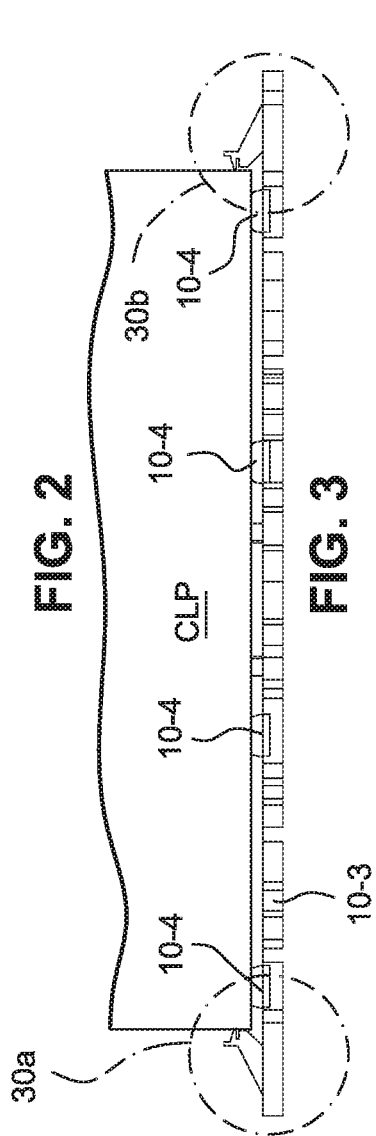

RETRACTABLE CARGO DECK ENTRANCE GUIDE ASSEMBLIES FOR PALLETIZED LOADS IN CARGO AIRCRAFT

CROSS-REFERENCE TO RELATED APPLICATION

The present application is based on and claims domestic priority benefits from U.S. Provisional Application Ser. No. 62/686,785 filed on Jun. 19, 2018, the entire contents of which are expressly incorporated hereinto by reference.

FIELD

The embodiments disclosed herein relate generally to entrance deck guide assemblies for guiding palletized loads onto the cargo deck of a cargo aircraft during on-ground loading operations.

BACKGROUND

Some cargo aircraft are known which use fixed (non-retractable) guides above the cargo area deck which encroach into the working volume of the cargo aircraft. Other cargo aircraft are known which use retractable guide mechanisms which alleviate the problems associated with non-retractable guides but require the use of special hand tools for handling operations.

It is known from U.S. Pat. No. 7,530,774 (the entire content of which is expressly incorporated hereinto by reference) that a mechanical stop may be provided to prevent longitudinal displacements of palletized loads during on-ground operations. The mechanical stop proposed by this '774 patent is located above the cargo floor, thereby encroaching into the working volume of the cargo. In case of a single failure of the lock feature, the movable parts will tend to deploy due to the action of the torsion springs acting on the hinge. In order to properly latch and lock the mechanism at the stowed position, therefor, a secondary action is needed which is supplied by sliding the lock feature in order to engage it into the recess on the movable part.

U.S. Pat. No. 8,066,458 (the entire content of which is expressly incorporated hereinto by reference) consists of a retractable centering device, which guides the palletized load when displaced during on-ground loading operations. The latching and locking sequence of such a device however demands a secondary action and, in case of single failure of the latch element, the movable part will be deployed as well, due to the torsion springs acting on the mechanism hinge. The proposal in the '458 patent is also physically located above the cargo floor, even when stowed, because it consists of a removable module attached over the floor panels

BRIEF DESCRIPTION

The retractable guide assemblies according to the embodiments disclosed herein provides for guidance of the palletized loads onto a cargo deck of a cargo aircraft during the on-ground loading operations for loading and storing the palletized loads inside the cargo area. When deployed, the guide assemblies of the embodiments disclosed herein will function to self-center the pallet in case of misalignment (which could otherwise cause loading and/or storage difficulties of the palletized load inside the cargo aircraft).

The operating mechanisms associated with the retractable guide assemblies of the embodiments disclosed herein can advantageously be stowed underneath the cargo floor flush with the cargo deck when not being used in order to preserve the working area of the cargo space and thereby not pose any hazard or obstruction during aerial delivery operations and/or to movement of personnel on the cargo deck. Moreover, no special hand tools are required in order to operationally move the guide assemblies between the stowed condition and a deployed condition.

According to certain embodiments, retractable guide assemblies are provided to guide cargo load pallets onto a cargo deck of a cargo aircraft, the guide assembly having a support subassembly comprising a recessed housing box, a moveable guide subassembly pivotally connected to the support subassembly so as to be pivotally moveable relative thereto, and an actuator subassembly operatively interconnecting the moveable guide subassembly and the support subassembly. The actuator subassembly may thereby allow the moveable guide subassembly to be pivotally moveable between (i) a releasably locked stowed condition, (ii) a releasably locked deployed condition and (iii) a freely moveable unlocked maintenance condition.

The moveable guide assembly may be provided with a hinge assembly providing a hinged connection to the support subassembly along an exterior lateral edge thereof. An opposite interior lateral edge also define an aft guide surface that is angularly inclined in a converging direction relative to a longitudinal centerline of the cargo aircraft, and a forward guide surface which is substantially parallel to the longitudinal centerline of the cargo aircraft.

In certain embodiments, the support subassembly may include a latch pin, while the actuator subassembly may include (i) a frame component, (ii) a shaft pivotally connected to the frame component, and (iii) a latch lever and hook element each connected to the shaft for pivotal movement therewith. The moveable subassembly may also include a pivotally moveable operation handle having a distal end that is releasably engaged with the latch lever when the moveable subassembly is in the stowed condition. In such an embodiment, pivotal movement of the operation handle disengages the distal end thereof with the latch lever to allow the frame component to pivotally move from the stowed condition to the deployed condition. The hook element will thereby engage the latch pin when the frame component pivotally moves from the stowed condition to the deployed condition so as to establish the releasably locked deployed condition.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIG. 2 is a perspective view of both guide assemblies in their respective positions in relation to each other on the cargo deck;

FIG. 3 is an end elevational view showing how a centering effect on the palletized cargo is achieved by the guide assemblies;

DETAILED DESCRIPTION

Figure 1:
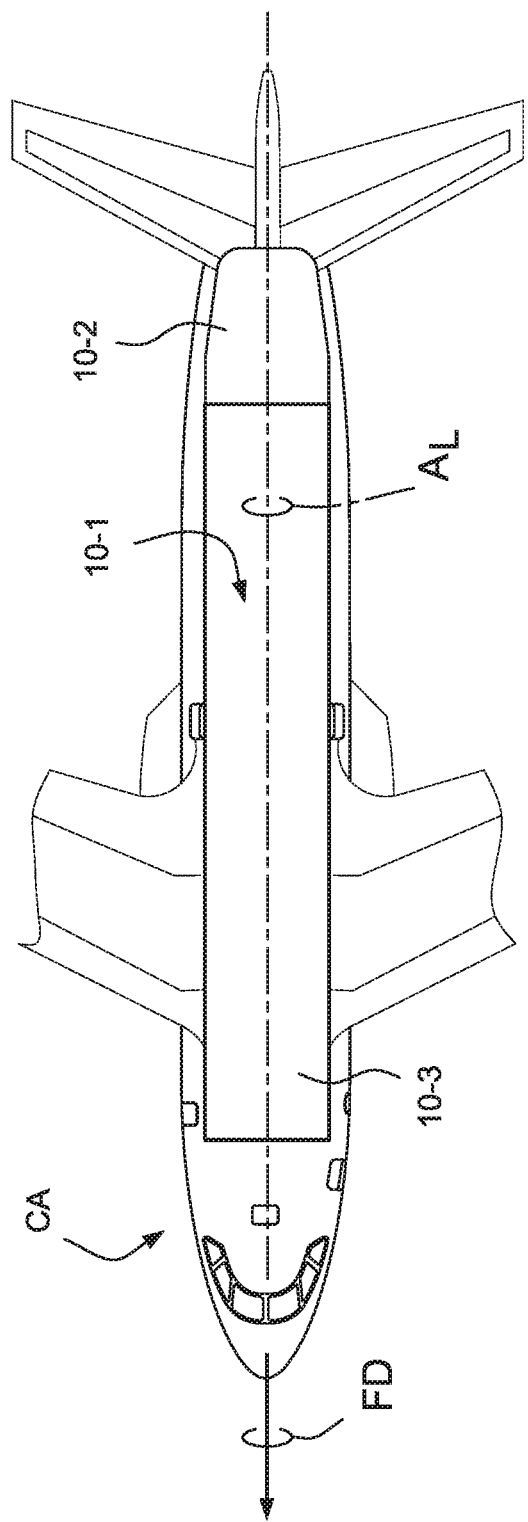
FIG. 1 represents a schematic top plan view of the cargo aircraft showing the location of the entrance guide assemblies in accordance with the embodiments disclosed herein, there being depicted a pair of symmetrically oppositely positioned guide assemblies.

Accompanying FIGS. 1-3 show increasingly larger scale depictions of an exemplary interior cargo compartment 10-1 within the fuselage 10 of a conventional cargo aircraft CA. As shown in FIG. 1, the cargo aircraft CA is provided with a rear-entry cargo door/ramp 10-2 and a cargo deck 10-3. The cargo deck 10-3 is adapted to support a number of conventional cargo load pallets CLP (not shown in FIG. 1, but see FIG. 3) however the cargo door/ramp 10-2 could similarly be configured so as to support cargo load pallets CLP. The cargo load pallets are positionally locked relative to the cargo deck 10-3 by a number of pallet lock assemblies (a representative few of which are identified by reference numeral 20 in FIG. 2) to be described in greater detail below.

As is conventional, the cargo deck 10-3 may include a series of laterally spaced apart roller equipped guides (a representative few of which are identified by reference numeral 10-4 in FIG. 2) aligned parallel to the longitudinal axis $A_L$ of the fuselage in the flight direction (arrow FD) of the aircraft CA for guiding the individual cargo load pallets CLP into the selected position within the cargo compartment 10-1.

As is known, access to the cargo compartment 10-1 may be achieved through the cargo door/ramp 10-2 when in a lowered position so as to allow the cargo load pallets CP to be loaded/unloaded from the cargo aircraft CA by suitable cargo handling equipment. To this end, the cargo deck 10-3 is provided with port and starboard guide assemblies 30a, 30b in accordance with the embodiments disclosed herein to allow guiding and centering of the cargo load pallets CLP relative to the cargo deck 10-3 and the longitudinal axis $A_L$ of the aircraft CA.

Figure 4:
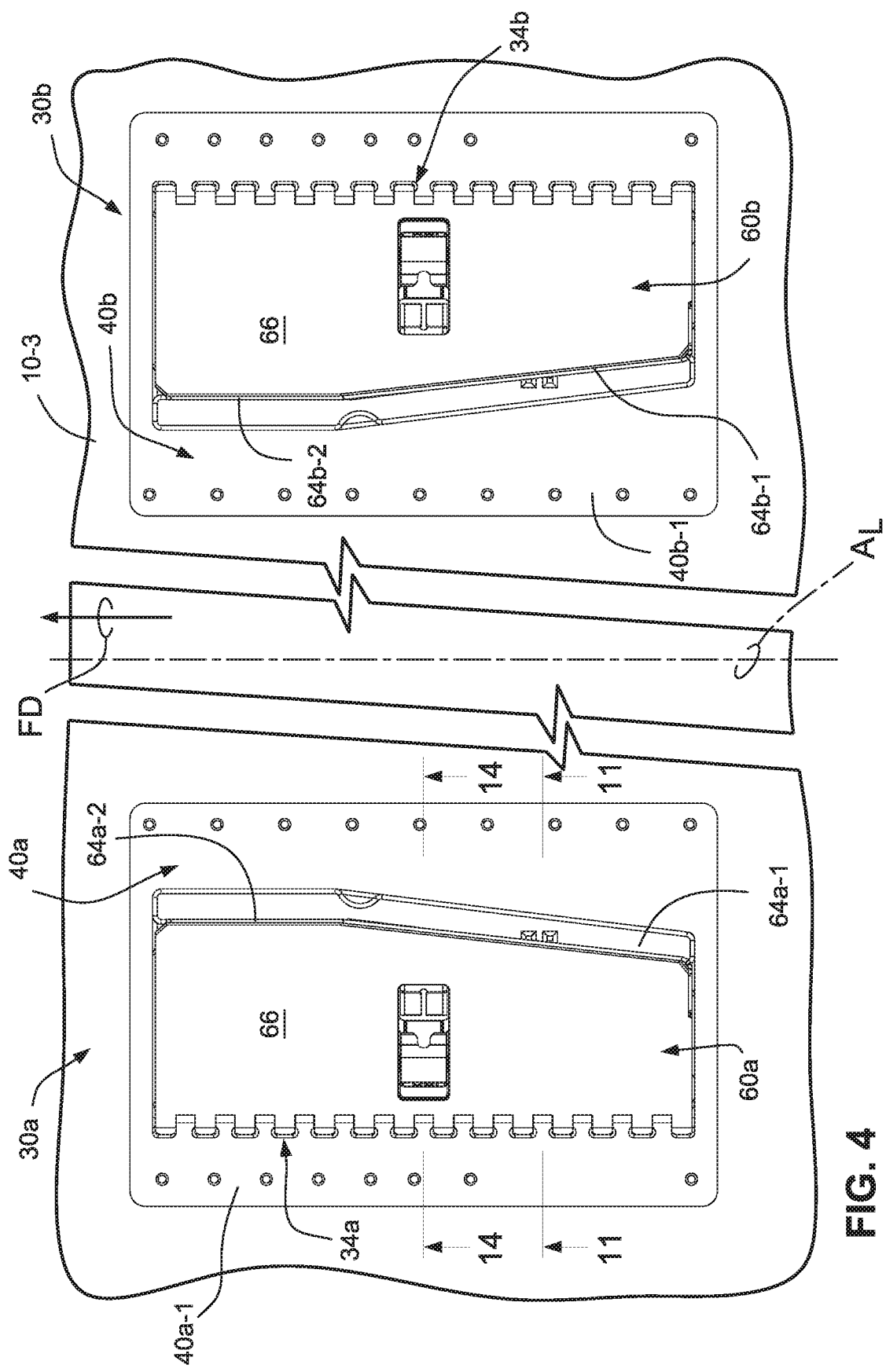
FIG. 4 is a top view of the port and starboard guide assemblies depicted in a stowed mode and showing the angularly sloped guide surface thereof which provides the self-centering effect on the palletized cargo loads.
Figure 5:
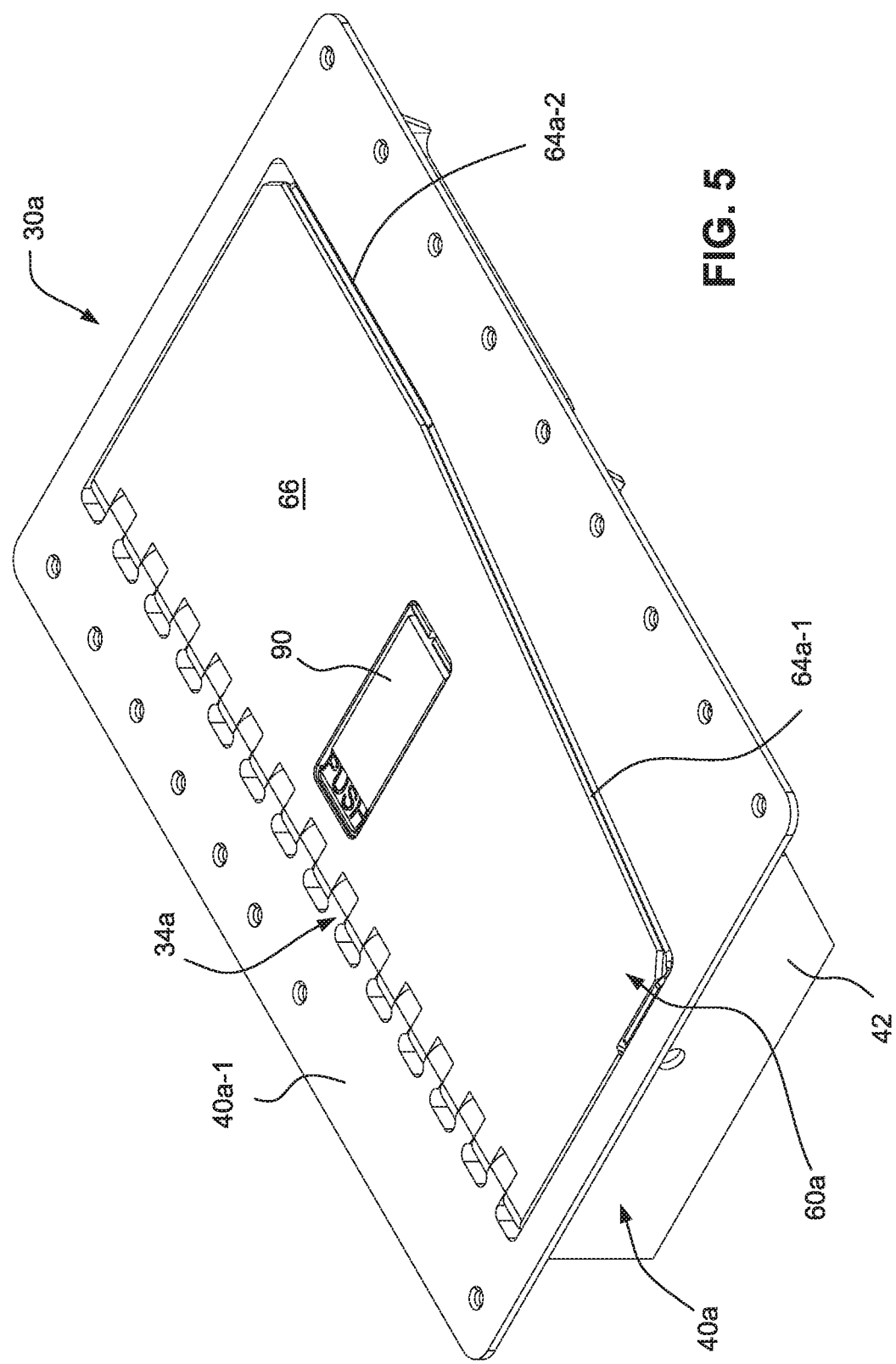
FIG. 5 is a representative perspective view of the port guide assembly depicted in a stowed mode flush with the cargo deck.
Figure 6:
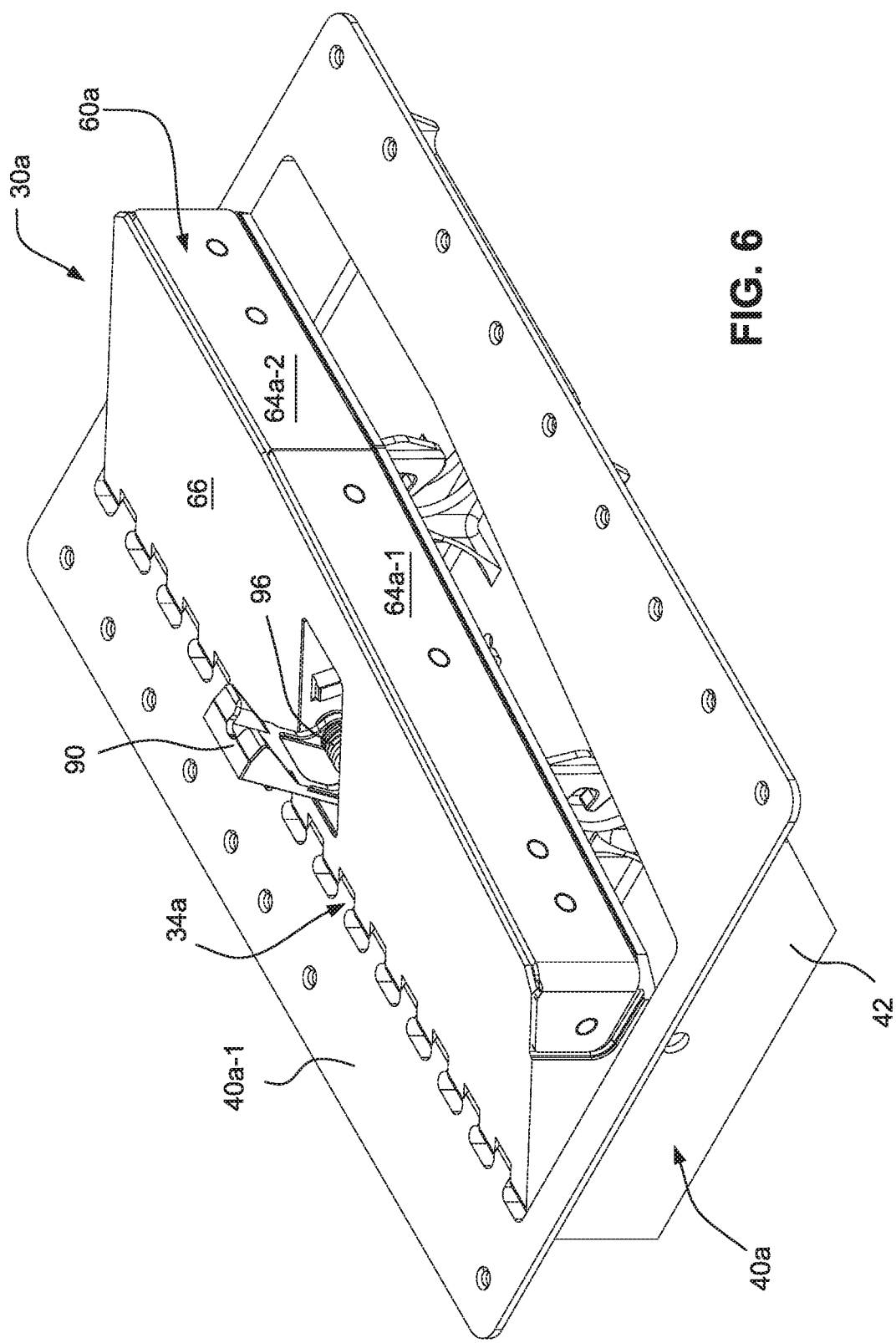
FIG. 6 is a perspective view showing the port guide assembly depicted in a deployed condition so as to be spaced above the cargo deck.

As is shown in FIGS. 4-6, each of the port and starboard guide assemblies 30a, 30b, respectively, includes a support subassembly 40a, 40b having surface flanges 40a-1, 40b-1 is fixed to the cargo deck 10-3 such that each of the guide assemblies 30a, 30b is opposingly separated relative to the longitudinal axis $A_L$ of the aircraft CA. A moveable subassembly 60a, 60b is provided with an outside lateral edge which is connected by a hinge assembly 34a, 34b to the stationary housing 32a, 32b and an interior edge having an aft guide surface portion 64a-1, 64b-1 and a forward guide surface portion 64a-2, 64b-2, respectively. As shown, the aft guide surface portions 64a-1, 64b-1 are angularly inclined in a converging direction relative to the flight direction FD of the aircraft CA and terminate in the forward guide surface portions 64a-2, 64b-2, respectively, the latter being substantially parallel to the flight direction FD of the aircraft CA. As such, cargo load pallets CLP being loaded onto the cargo ramp will encounter initially the aft guide surface portions 64a-1, 64b-1 of the guide assemblies 30a, 30b, respectively, and will be guided thereby to a self-centering location relative to the longitudinal axis $A_L$ of the aircraft CA. Thereafter, the forward guide surface portions 64a-2, 64b-2 will then maintain such self-centering location as the cargo load pallet is moved into the cargo compartment 10-1 along the cargo deck in the flight direction FD of the aircraft CA.

The following discussion will focus on the structural and functional attributes of the port guide assembly 30a. It will of course be understood that similar but mirror image structures performing similar but mirror image functions will also be present in the starboard guide assembly 30b. Thus, the following discussion pertaining to the port guide assembly 30a will be understood as being equally applicable to the starboard guide assembly 30b.

Figure 7:
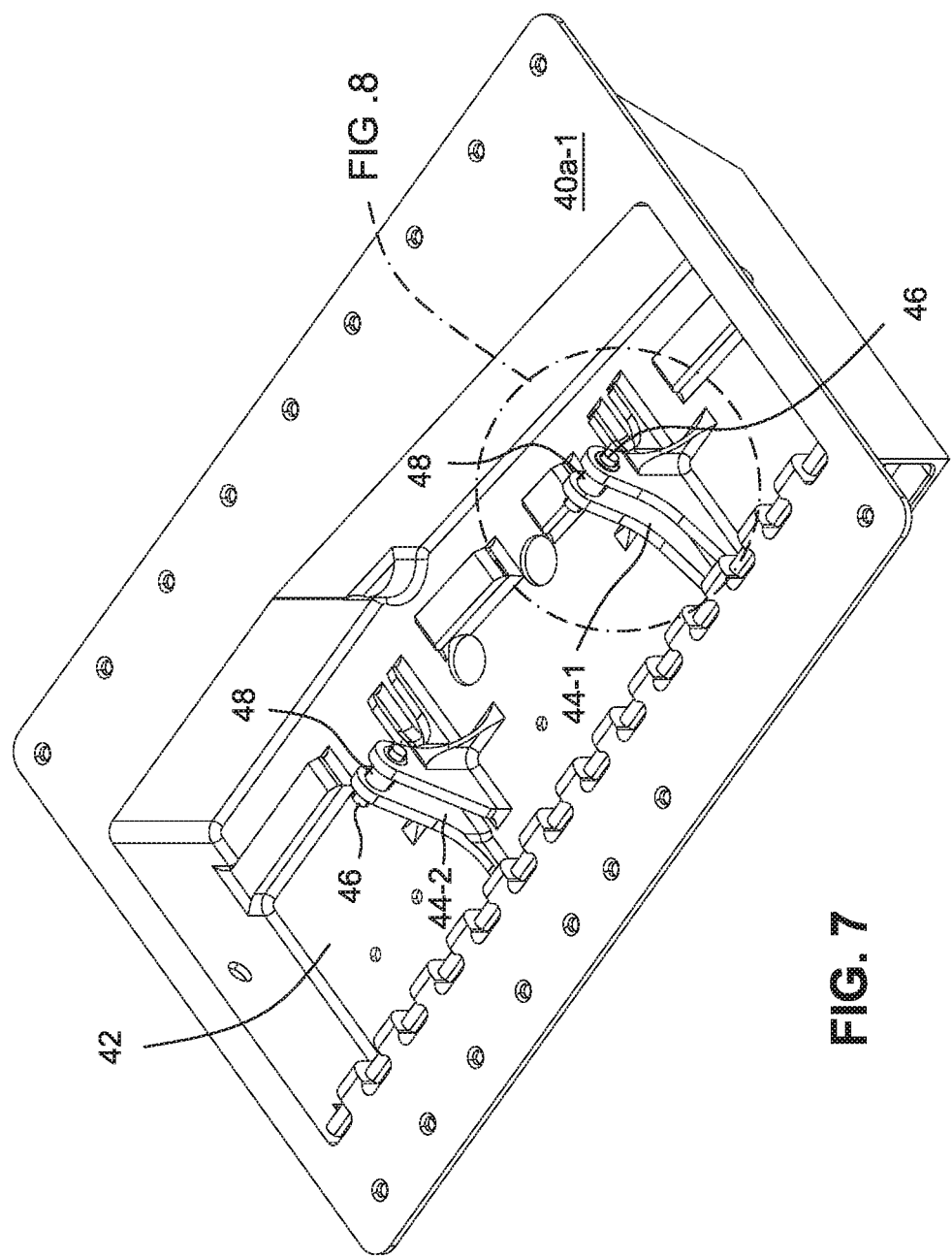
FIG. 7 is a top perspective view of the fixed support subassembly components of the port guide assembly.
Figure 8:
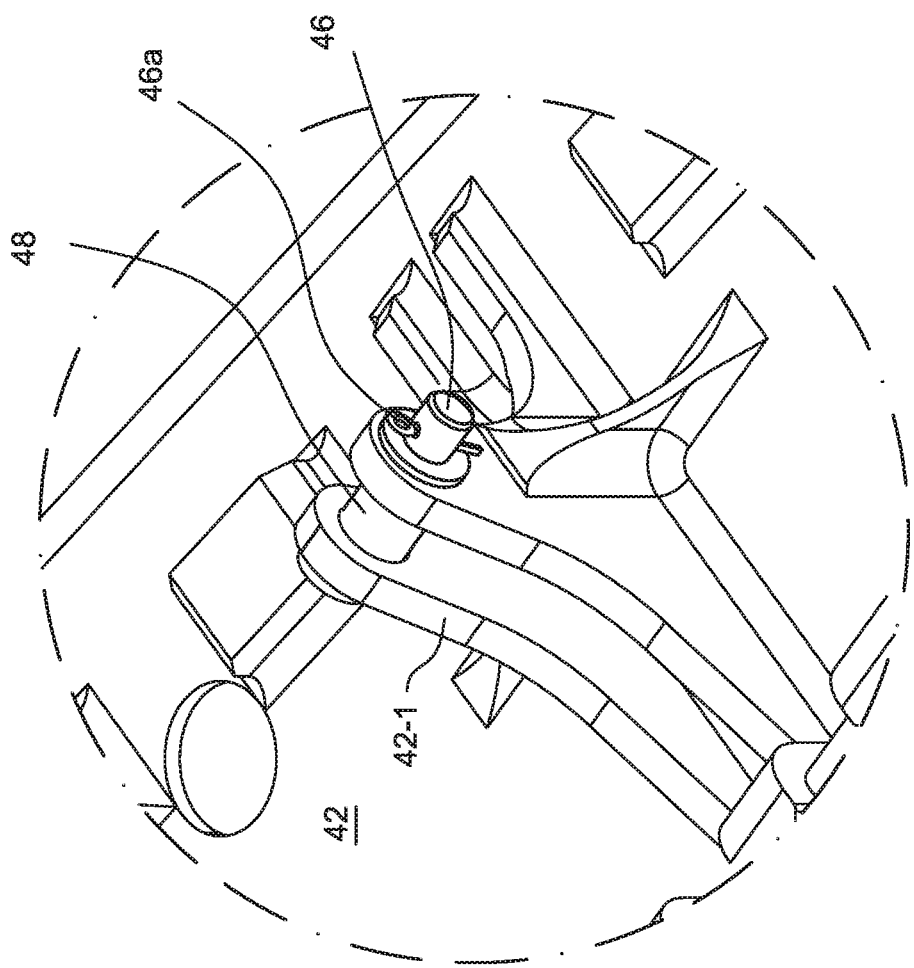
FIG. 8 is an enlarged detail view of the support pins and bushing employed in the fixed support subassembly shown in FIG. 7.

The fixed support subassembly 40a and its associated components is shown in greater detail in accompanying FIGS. 7 and 8. As shown, the support subassembly 40a includes a housing box 42 recessed below the surface flanges 40a-1. The housing box 42 includes support bracket pairs 44-1, 44-2 extending upwardly from the bottom surface of the housing box 42 and separated from one another along the longitudinal axis $A_L$ of the aircraft CA. As is shown in FIG. 8, each of support brackets 44-1 is adapted to receive a latch pin 46 and an associated sleeve 48. The latch pin 46 may be retained within the aperture of the support brackets 44-1, 44-2 by means of a cotter pin 46a.

Figure 9:
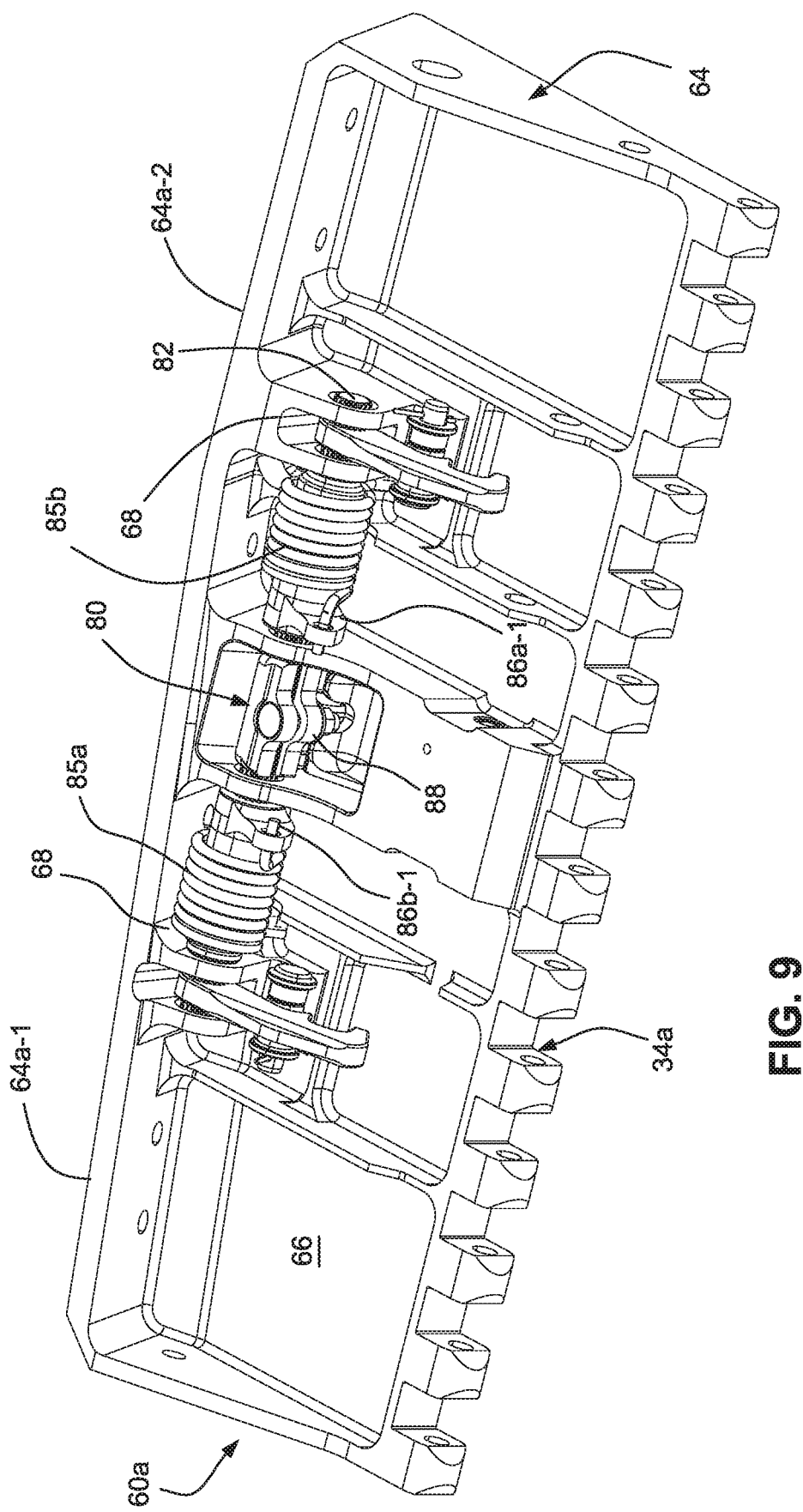
FIG. 9 is a detailed perspective view of the movable subassembly components of the port guide assembly shown in FIG. 7.

The moveable subassembly 60a of the port guide assembly 30a is depicted in greater detail in accompanying FIG. 9. In this regard, the moveable subassembly 60a is shown in FIG. 9 from the bottom so as to provide more visibility to the associated components. As shown, the moveable subassembly 60a includes a rigid frame component 62 which integrally includes a portion of the hinge assembly 34a along one edge thereof and defines the angular aft and parallel forward guide surfaces 64a-1 and 64a-2, respectively. A planar top plate 66 is fixed to the frame component 62 so as to be substantially flush with the cargo deck 10-3 when the moveable component 60a is in a stowed condition. The frame also integrally includes separated mounts 68 for operatively mounting the actuator subassembly 80 thereto.

Figure 10:
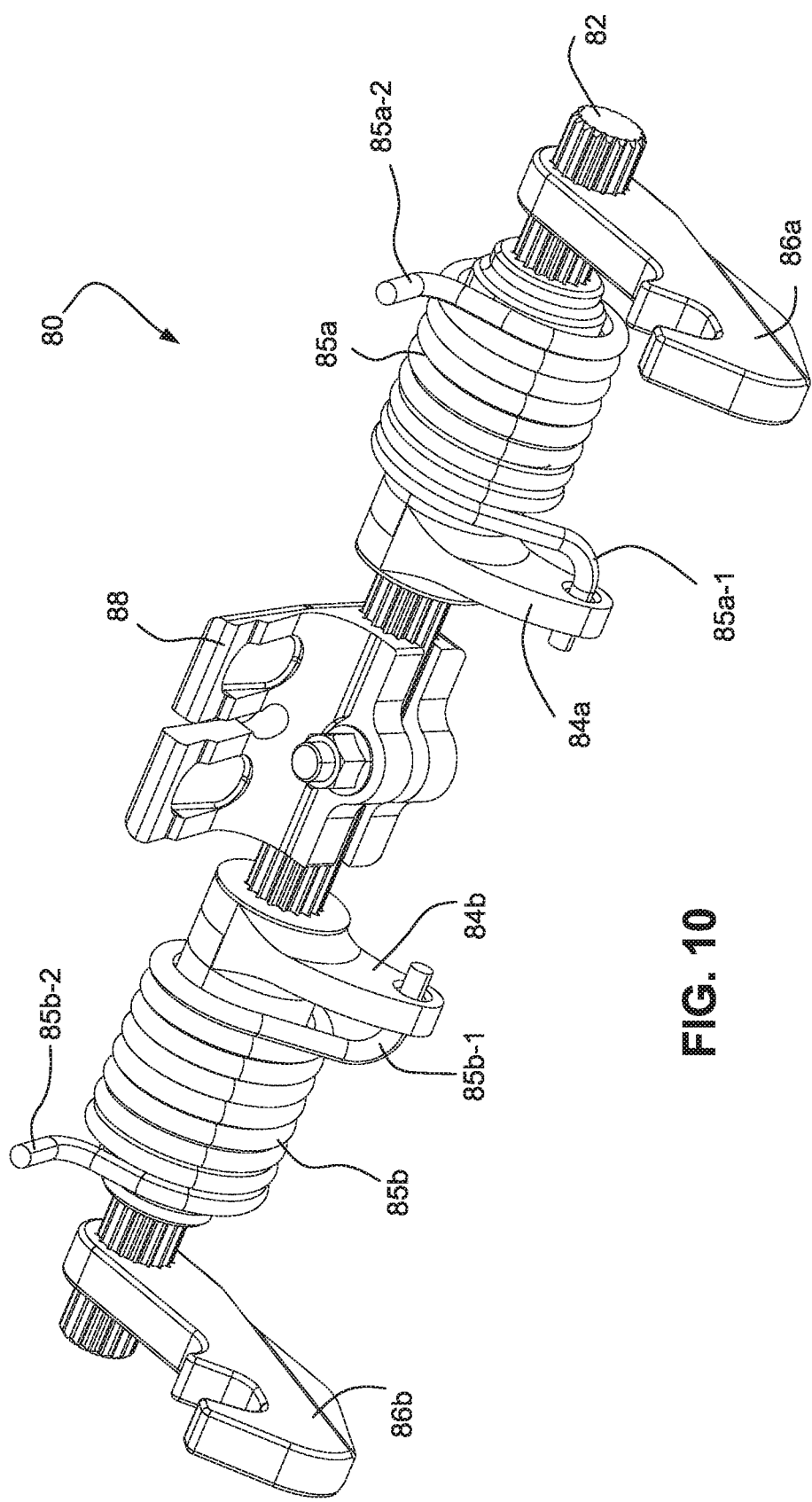
FIG. 10 is an enlarged detailed perspective view of the splined shaft and associated components thereof forming part of the moveable subassembly depicted in FIG. 9.

The actuator subassembly 80 is shown in greater detail in FIG. 10. As shown, the actuator subassembly includes a splined shaft 82 which is received within bushings associated with the mounts 68 of the frame component 62 (see FIG. 9) for rotational movement about its axis. The splined shaft 82 carries axially spaced apart fixed-position retainers 84a, 84b for receiving one tail end 85a-1, 85b-1 of a respective torsion spring 85a, 85b, respectively. An opposite tail end 85a-2, 85b-2 is fixed to the frame component 62. A pair of axially separated hook elements 86a, 86b are positioned near each end of the splined shaft 82, while a latch lever 88 is positioned near the mid-point of the splined shaft 82 between the torsion springs 85a, 85b.

Figure 11:
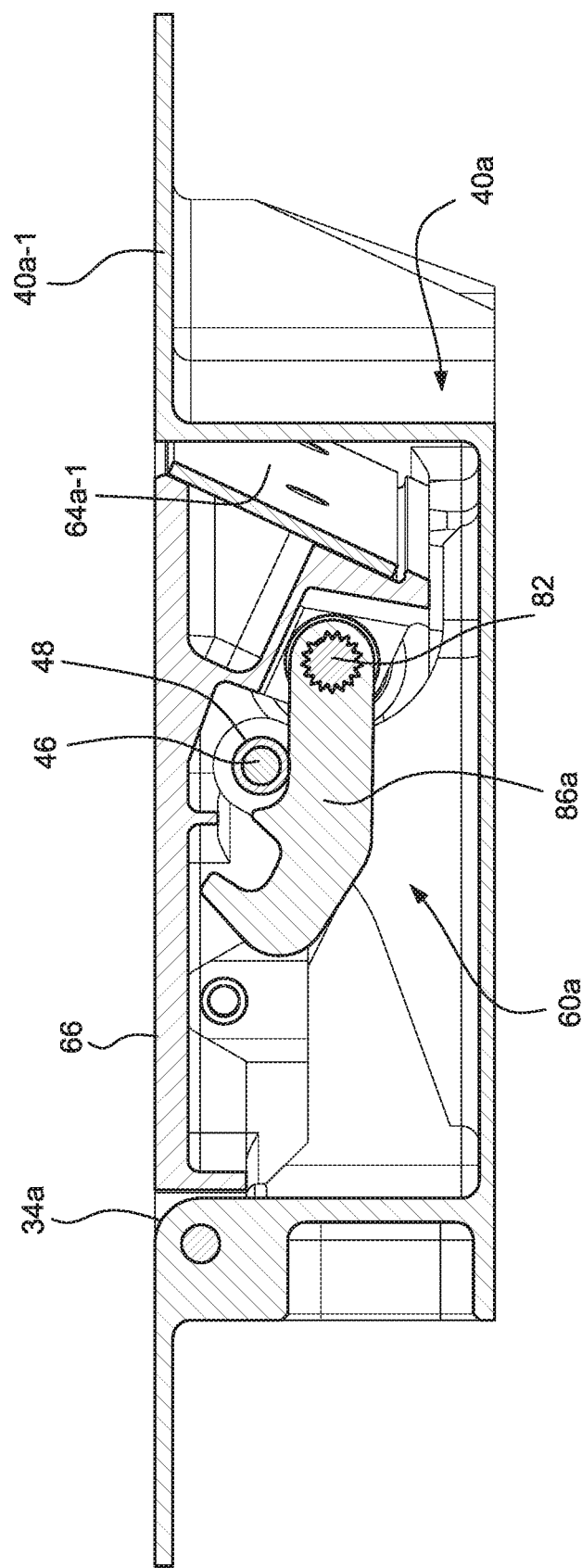
FIG. 11 is a cross-sectional view of the port guide assembly in a stowed condition as taken along section lines 11-11 in FIG. 4.
Figure 12:
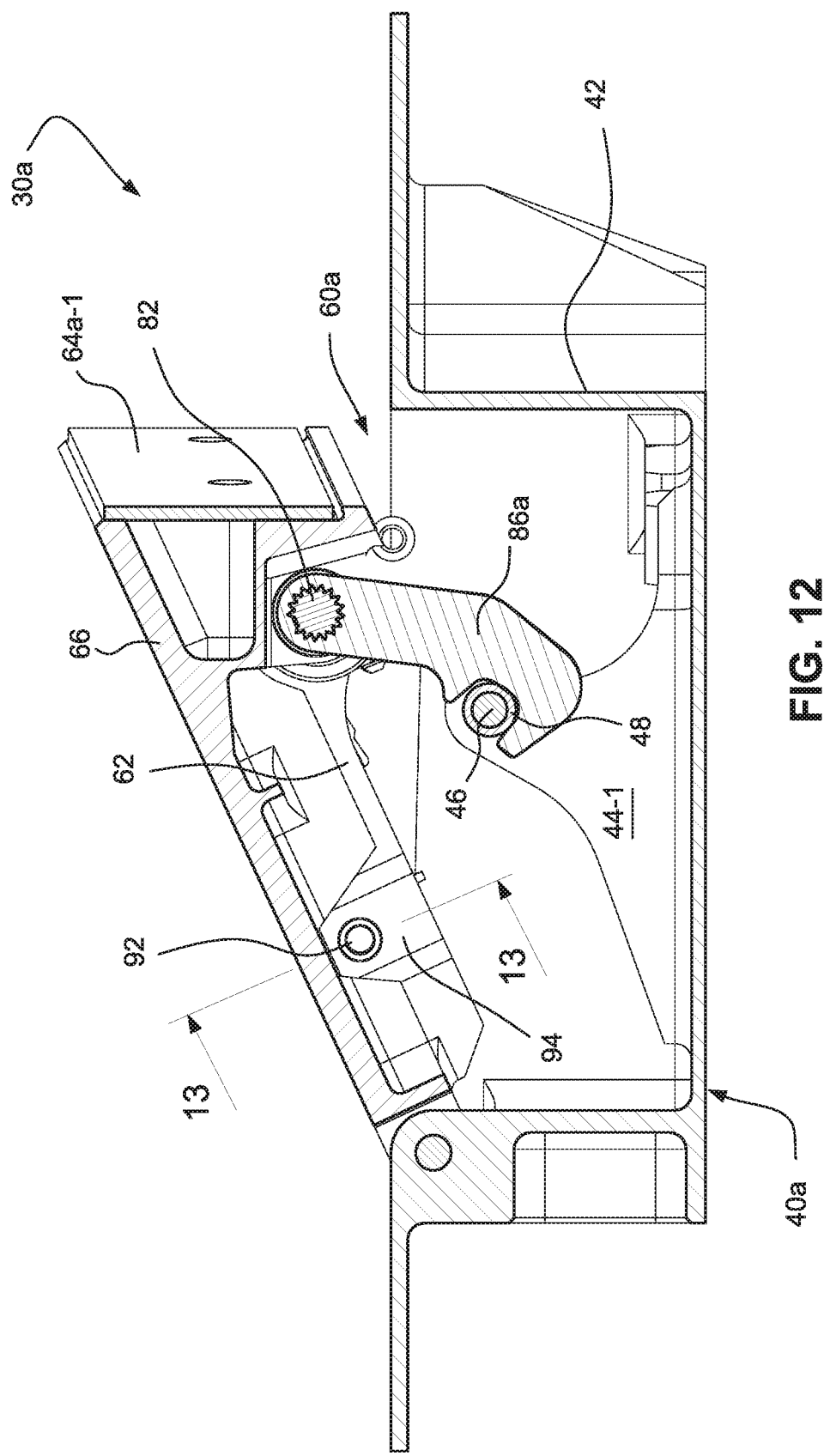
FIG. 12 is a cross-sectional view of the port guide assembly shown in FIG. 11 but depicted in a deployed condition.
Figure 13:
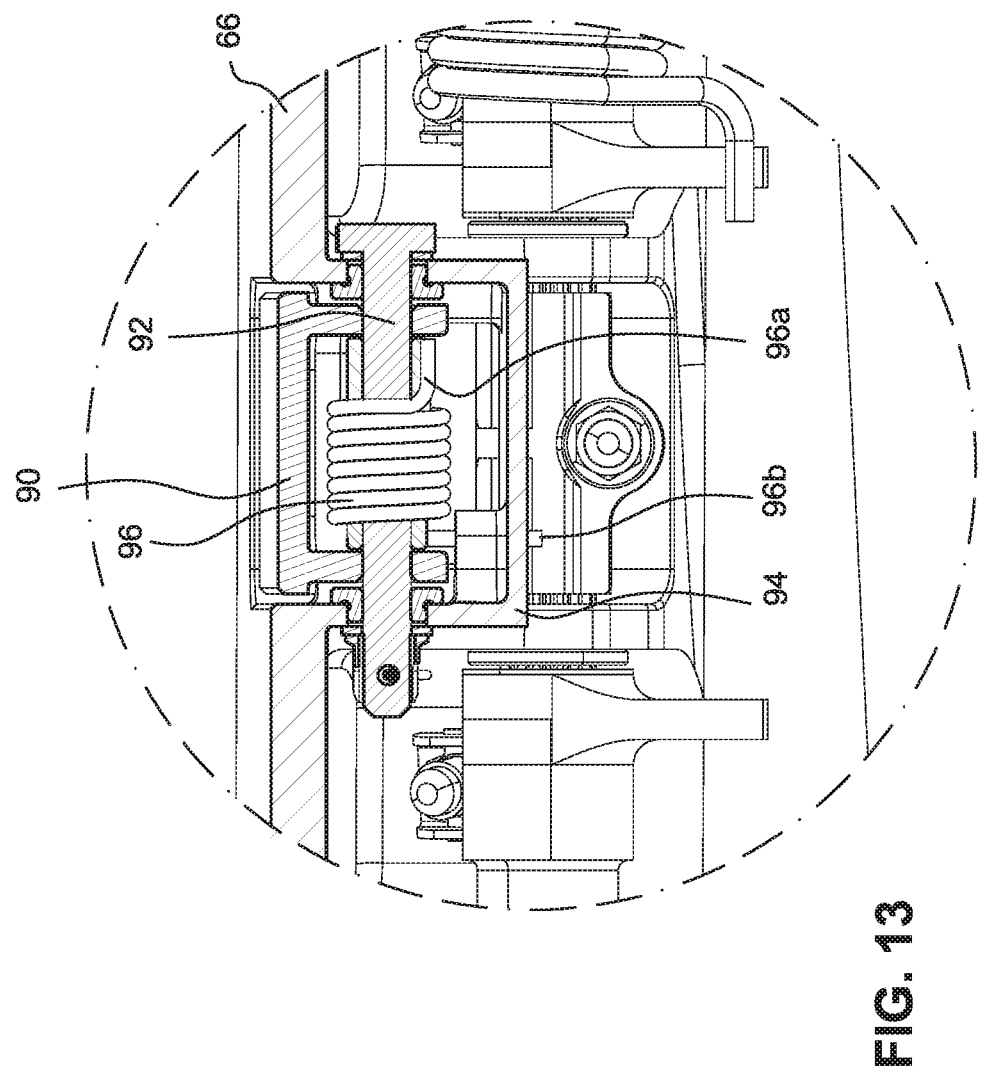
FIG. 13 is an enlarged detail view of the handle subassembly as taken along lines 13-13 in FIG. 12.

In order to move the moveable subassembly 60a of the port guide assembly 30a from its releasably locked stowed condition as shown in FIG. 11 (whereby the top plate 66 thereof is substantially flush with the flanges 40a-1 of the support subassembly 40 and thus substantially flush to the cargo deck 10-3), and into the releasably locked deployed condition as shown in FIG. 12 (whereby the top plate 66 thereof extends upwardly above the cargo deck 10-3 thereby exposing the aft and forward guide surfaces 64a-1, 64a-2), an operator would manually depress the proximal end of the operation handle 90. As shown in greater detail in FIG. 13, the handle 90 is mounted pivotally to a mounting pin 92 associated with the actuator mount 94 of the frame component 62. A torsion spring 96 is positioned around the mounting pin 92 and has a tail end 96a fixed to a rear portion of the handle 92 and an opposite tail end 96b fixed to the mount 94.

Figure 14:
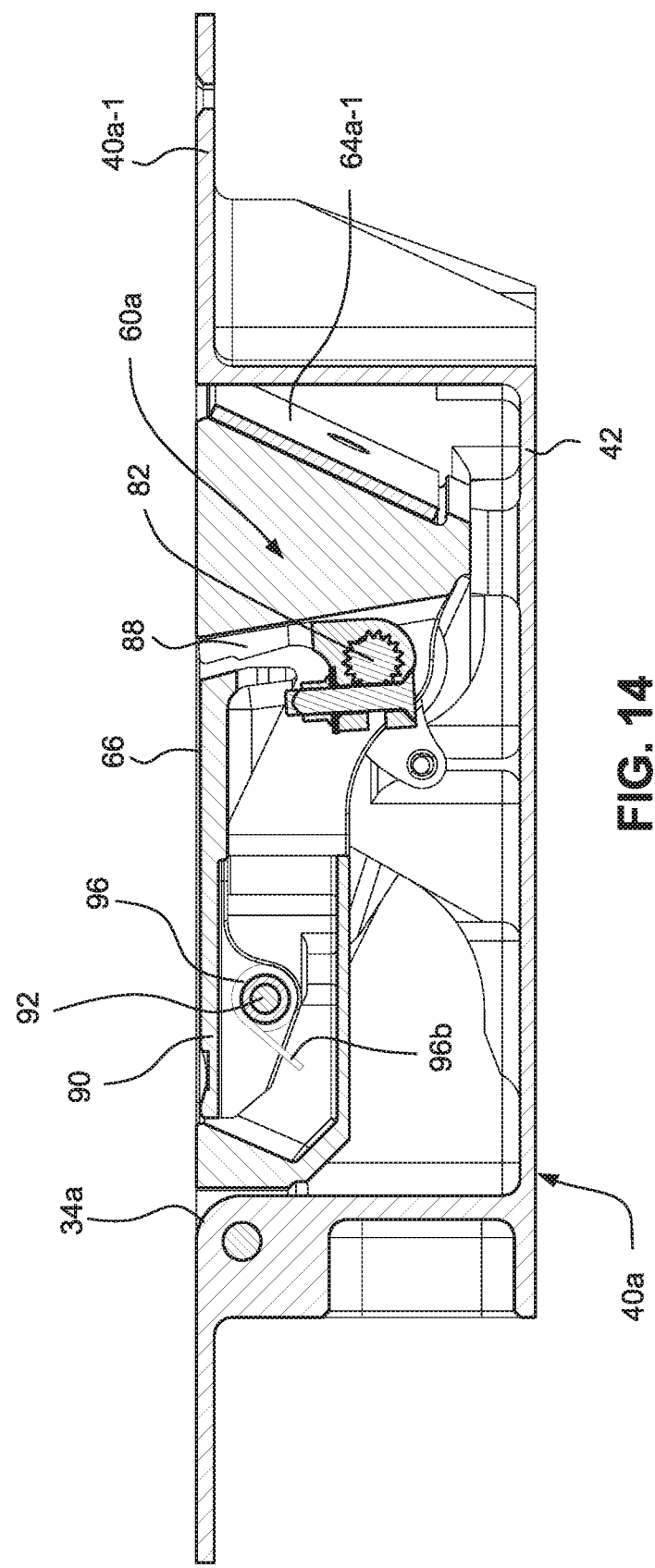
FIG. 14 is a cross-sectional view of the port guide assembly in a stowed condition as taken along section lines 14-14 in FIG. 4.
Figure 15:
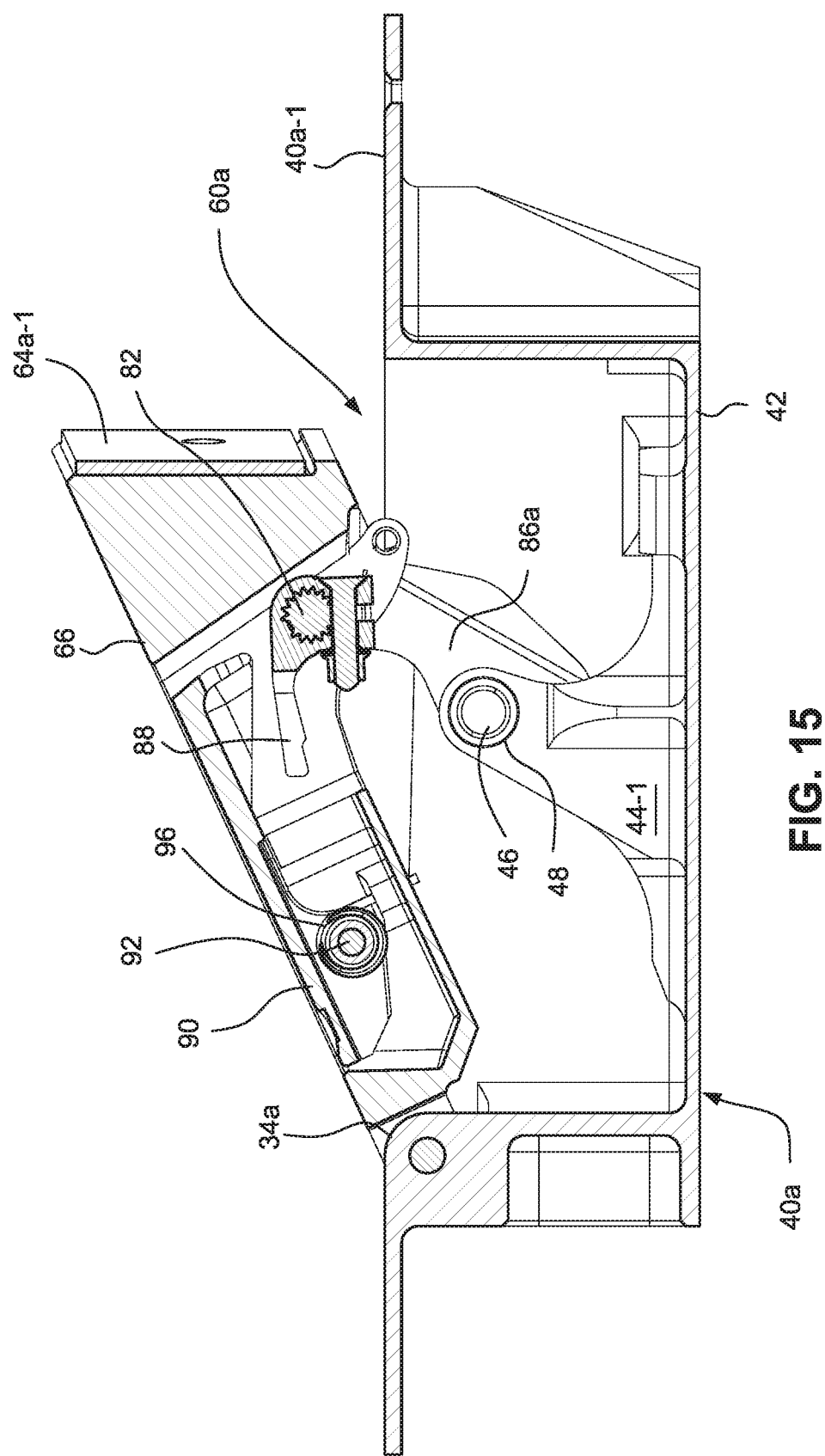
FIG. 15 is a cross-sectional view of the guide assembly similar to FIG. 14 but depicted in a deployed condition.

As is perhaps best shown in FIGS. 14-15, the latch lever 88 is releasably engaged with a distal end of the operation handle 90 when the guide assembly 60a is in the stowed condition. While in the stowed condition as shown by FIG. 14, each of the hooks 86a, 86b are positioned within each of the support bracket pairs 44-1, 44-2. Applying a downward force on the proximal end of the operation handle 90 will cause it to rotate in a counterclockwise direction as viewed in FIGS. 14-15 around the mounting pin 92 against the spring force of the torsion spring 96. This rotation of the operation handle 90 will thereby cause the distal end thereof to be raised relative to the latch lever 88 thereby releasing its locked engagement with the distal end of the operation handle 90. The latch lever 88 will then responsively be caused to rotate in a counterclockwise direction as viewed in FIGS. 14-15 under bias force exerted thereon by the torsion springs 85a, 85b. At this time, since the hooks 86a, 86b are under spring-loaded force of the springs 85a, 85b, they will simultaneously be rotated in response to the disengagement of the latch lever 88 and the operation handle 90 until each of the hooks 86a, 86b is releasably engaged with their respective latch pin 46 and associated sleeve 48. At this point the guide assembly 30a is in its releasably locked deployed condition as shown by FIG. 15. While in such a deployed condition, the loading and self-centering guiding of cargo load pallets CLP may proceed as previously described.

In order to return the guide assembly 30a to its stowed condition, one need only to apply sufficient force on the top plate 66 (e.g., as may be accomplished by an operator stepping on the top plate 66) to cause the hooks 86a, 86b to forcibly release engagement with their respective latch pin 46 and associated sleeve 48. This movement will in turn cause the latch lever 82 to pivot in a clockwise direction as shown in FIG. 15 against the spring force of the torsion springs 85a, 85b until it is once again releasably engaged with the distal end of the operation handle 90 as shown in FIG. 14.

Figure 16:
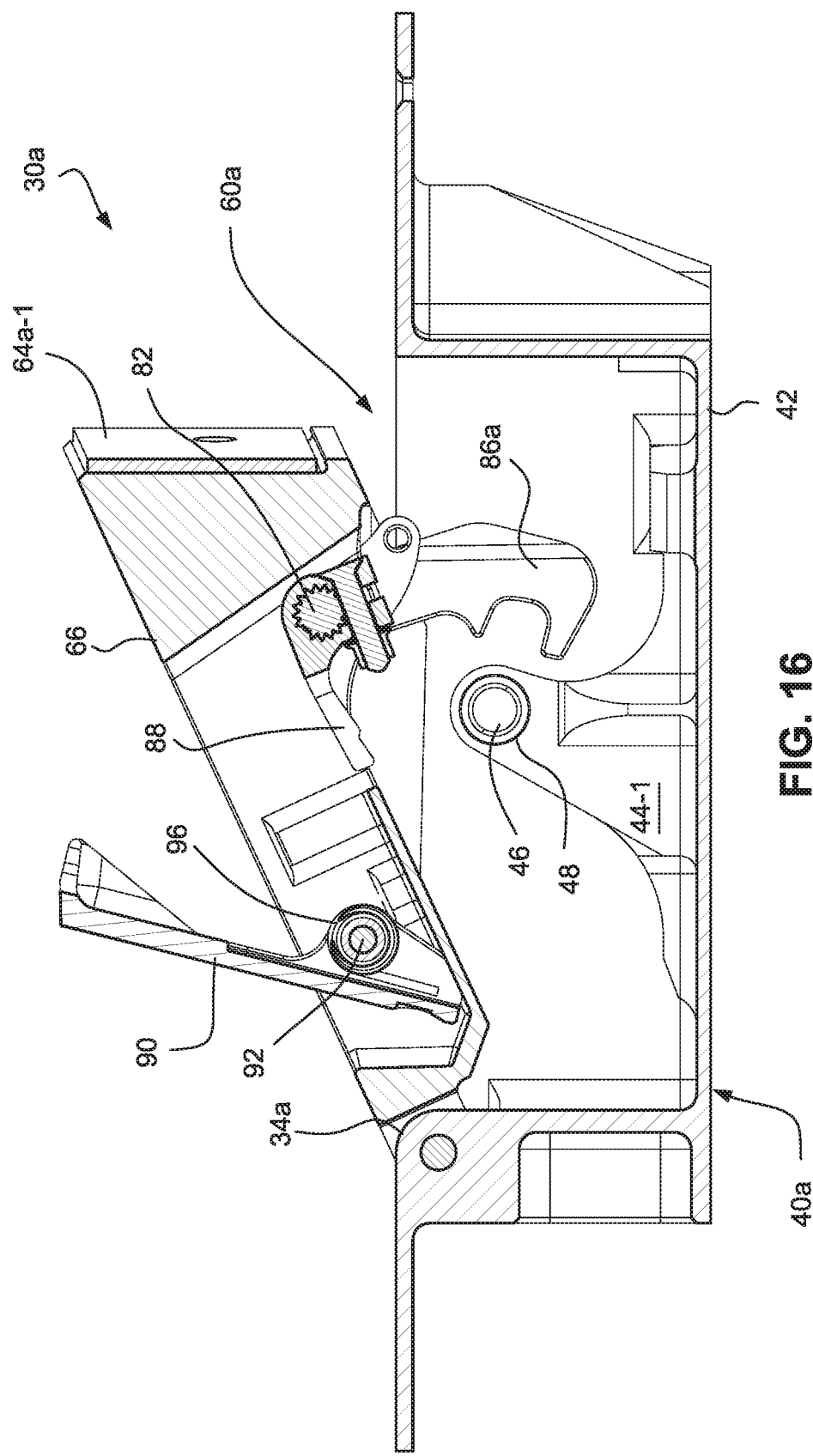
FIG. 16 is a perspective view of the port guide assembly similar to FIG. 14 but depicted in a maintenance mode whereby the moveable subassembly is disengaged from the latch pins.

In the event that a maintenance procedure is required, the operator merely needs to pull on the distal end of the operation handle 90 while the guide assembly 60a is in its deployed condition so as to expose the latch lever 88. An operator may then depress the latch lever 88 causing the hooks 86a, 86b to be fully disengaged with their respective latch pin 46 and associated sleeve 48. At this point, the moveable subassembly 60a will be unlocked from the support subassembly 40a and may then be freely pivoted upwardly about the hinge assembly 34a thereby exposing the recessed housing box 42 to allow maintenance and/or cleaning of the internal components. Such an unlocked maintenance condition is depicted in FIG. 16.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. A retractable guide assembly for guiding cargo load pallets onto a cargo deck of a cargo aircraft, the guide assembly comprising:
    a support subassembly comprising a recessed housing box and a latch pin;
    a moveable guide subassembly pivotally connected to the support subassembly so as to be pivotally moveable relative thereto; and
    an actuating subassembly operatively interconnecting the moveable guide subassembly and the support subassembly to allow the moveable guide subassembly to be pivotally moveable between (1) a releasably locked stowed condition, (2) a releasably locked deployed condition and (3) a freely moveable unlocked maintenance condition, wherein the actuating subassembly comprises:
        (i) a frame component;
        (ii) shaft pivotally connected to the frame component; and
        (iii) a latch lever and hook element each connected to the shaft for pivotal movement therewith; and wherein
    the moveable subassembly comprises a pivotally moveable operation handle having a distal end that is releasably engaged with the latch lever when the moveable subassembly is in the stowed condition, and wherein
    pivotal movement of the operation handle disengages the distal end thereof with the latch lever to allow the frame component to pivotally move from the stowed condition to the deployed condition, and wherein
    the hook element engages the latch pin when the frame component pivotally moves from the stowed condition to the deployed condition so as to establish the releasably locked deployed condition.

2. The retractable guide assembly as in claim 1, wherein the moveable guide assembly comprises:
    a hinge assembly providing a hinged connection to the support subassembly along an exterior lateral edge thereof, and
    an opposite interior lateral edge defining an aft guide surface that is angularly inclined in a converging direction relative to a longitudinal centerline of the cargo aircraft, and a forward guide surface which is substantially parallel to the longitudinal centerline of the cargo aircraft.

3. The retractable guide assembly as in claim 1, wherein the actuating subassembly comprises an actuator spring element operatively associated with the shaft for exerting a spring force on the latch lever in a direction to provide engagement with the distal end of the operation lever.

4. The retractable guide assembly as in claim 3, wherein the actuator spring element is also operatively associated with the hook element so as to exert a spring force to the hook element causing the hook element to rotate into engagement with the latch pin upon disengagement between the distal end of the operation handle and the latch lever.

5. The retractable guide assembly as in claim 3, wherein the moveable subassembly further comprises a mounting pin which is operatively connected to the operation handle to allow the distal end of the operation handle to be pivotally displaced upwardly relative to the latch lever to thereby disengage the latch lever and the distal end of the operation handle.

6. The retractable guide assembly as in claim 5, further comprising a handle spring element operatively associated with the mounting pin of the operation handle to exert a spring force on the operation handle in an opposite direction of the spring force exerted by the actuator spring element.

7. The retractable guide assembly as in claim 6, wherein each of the handle spring element and the actuator spring element is a torsion spring.

8. The retractable guide assembly as in claim 1, wherein
the support subassembly comprises a pair of latch pins, and wherein
the moveable subassembly comprises a pair a pair of hook elements releasably engageable with a respective one of the latch pins.

9. A cargo aircraft comprising:
a cargo compartment having a cargo deck; and
an opposed mirror image pair of retractable guide assemblies as in claim 1.

10. A guide assembly for cargo load pallets comprising:
a support subassembly comprising a recessed housing box and a latch pin;
a moveable guide subassembly receivable within the recessed housing box and being pivotally connected to the support subassembly so as to be pivotally moveable relative thereto; and
an actuating subassembly operatively interconnecting the moveable guide subassembly and the support subassembly to allow the moveable guide subassembly to be pivotally moveable between a releasably locked stowed condition and a releasably locked deployed condition, wherein the actuating subassembly comprises:
(i) a frame component;
(ii) shaft pivotally connected to the frame component; and
(iii) a latch lever and hook element each connected to the shaft for pivotal movement therewith; wherein
the moveable guide subassembly comprises a pivotally moveable operation handle having a distal end that is releasably engaged with the latch lever when the moveable subassembly is in the stowed condition, and wherein pivotal movement of the operation handle disengages the distal end thereof with the latch lever to allow the frame component to pivotally move from the stowed condition to the deployed condition, and wherein
the hook element engages the latch pin when the frame component pivotally moves from the stowed condition to the deployed condition so as to establish the releasably locked deployed condition.

11. The retractable guide assembly as in claim 10, wherein the actuating subassembly comprises an actuator spring element operatively associated with the shaft for exerting a spring force on the latch lever in a direction to provide engagement with the distal end of the operation lever.

12. The retractable guide assembly as in claim 11, wherein the actuator spring element is also operatively associated with the hook element so as to exert a spring force to the hook element causing the hook element to rotate into engagement with the latch pin upon disengagement between the distal end of the operation handle and the latch lever.

13. The retractable guide assembly as in claim 12, wherein the moveable subassembly further comprises a mounting pin which is operatively connected to the operation handle to allow the distal end of the operation handle to be pivotally displaced upwardly relative to the latch lever to thereby disengage the latch lever and the distal end of the operation handle.

14. The retractable guide assembly as in claim 13, further comprising a handle spring element operatively associated with the mounting pin of the operation handle to exert a spring force on the operation handle in an opposite direction of the spring force exerted by the actuator spring element.

15. The retractable guide assembly as in claim 14, wherein each of the handle spring element and the actuator spring element is a torsion spring.

16. The retractable guide assembly as in claim 10, wherein
the support subassembly comprises a pair of latch pins, and wherein
the moveable subassembly comprises a pair a pair of hook elements releasably engageable with a respective one of the latch pins.

17. The retractable guide assembly as in claim 10, wherein the actuating subassembly allows the moveable subassembly to assume a freely moveable unlocked maintenance condition wherein the moveable subassembly can be moved freely relative to the support subassembly to allow access to the recessed housing box.

18. The retractable guide assembly as in claim 10, wherein the moveable guide assembly comprises:
a hinge assembly providing a hinged connection to the support subassembly along an exterior lateral edge thereof, and
an opposite interior lateral edge defining an aft guide surface that is angularly inclined in a converging direction relative to a longitudinal centerline of the cargo aircraft, and a forward guide surface which is substantially parallel to the longitudinal centerline of the cargo aircraft.

19. A cargo aircraft comprising:
a cargo compartment having a cargo deck; and
a guide assembly as in claim 10 operatively associated with the cargo deck.

* * * * *